(12) United States Patent
Granger

(10) Patent No.: US 7,383,638 B2
(45) Date of Patent: Jun. 10, 2008

(54) SYSTEM FOR IDENTIFYING THE POSITION OF THREE-DIMENSIONAL MACHINE FOR MEASURING OR MACHINING IN A FIXED FRAME OF REFERENCE

(75) Inventor: Romain Granger, Lavardin (FR)

(73) Assignee: Romer, Montiore sur le Loir (FR)

( * ) Notice: Subject to any disclaimer, the term of this patent is extended or adjusted under 35 U.S.C. 154(b) by 0 days.

(21) Appl. No.: 11/550,547

(22) Filed: Oct. 18, 2006

(65) Prior Publication Data

US 2007/0097382 A1 May 3, 2007

(30) Foreign Application Priority Data

Oct. 21, 2005 (FR) .................................. 05 10745

(51) Int. Cl.
*G01B 5/008* (2006.01)
*G01B 7/008* (2006.01)

(52) U.S. Cl. ........................................ 33/503; 33/608

(58) Field of Classification Search ................. 33/503, 33/1 G, 608, 1 BB, 1 CC, 1 MP
See application file for complete search history.

(56) References Cited

U.S. PATENT DOCUMENTS

| | | | | |
|---|---|---|---|---|
| 3,129,512 A | * | 4/1964 | Schiler | 33/18.1 |
| 3,531,868 A | * | 10/1970 | Stevenson | 33/503 |
| 4,492,036 A | * | 1/1985 | Beckwith, Jr. | 33/613 |
| 4,691,446 A | * | 9/1987 | Pitches et al. | 33/516 |
| 4,891,889 A | * | 1/1990 | Tomelleri | 33/503 |
| 4,961,267 A | | 10/1990 | Herzog | |
| 5,150,529 A | * | 9/1992 | Collingwood | 33/503 |
| 5,189,797 A | | 3/1993 | Granger | |
| 5,412,880 A | * | 5/1995 | Raab | 33/503 |
| 5,636,445 A | * | 6/1997 | Johansson et al. | 33/288 |
| 5,757,499 A | | 5/1998 | Eaton | |
| 6,519,860 B1 | * | 2/2003 | Bieg et al. | 33/503 |

(Continued)

FOREIGN PATENT DOCUMENTS

EP 0398073 A2 2/1990

(Continued)

OTHER PUBLICATIONS

French Search Report for Serial No. 0510745 dated Jul. 25, 2006.

*Primary Examiner*—Christopher W Fulton
(74) *Attorney, Agent, or Firm*—McCormick, Paulding & Huber LLP

(57) ABSTRACT

The invention relates to a system for identifying the position of a machine for three-dimensional measuring or machining in a fixed frame of reference. In accordance with the invention, the system comprises:

a first base for resting at an identified point on a support wall associated with the machine stand, said base being provided on its top with a bearing platform;

a second base identical to the first base, for resting at an identified point on a support surface associated with the fixed frame of reference; and a multi-axis assembly having two hinged arms that are coupled together, and having two endpieces coupled to said arms, each endpiece having a main axis that coincides with the central axis of the corresponding base when said endpiece is in place, said multi-axis assembly also being fitted with integrated angle encoders measuring the respective angles of rotation about each of its axes.

12 Claims, 7 Drawing Sheets

U.S. PATENT DOCUMENTS

| | | | |
|---|---|---|---|
| 6,598,306 B2 * | 7/2003 | Eaton | 33/503 |
| 6,611,346 B2 | 8/2003 | Granger | |
| 7,051,447 B2 * | 5/2006 | Kikuchi et al. | 33/503 |
| 7,197,836 B2 * | 4/2007 | Kikuti | 33/555 |
| 2001/0024283 A1 | 9/2001 | Granger | |

FOREIGN PATENT DOCUMENTS

| | | |
|---|---|---|
| FR | 2721395 A1 | 6/1994 |
| FR | 2750546 A1 | 1/1998 |
| FR | 2764992 A1 | 12/1998 |
| FR | 2776373 A1 | 9/1999 |
| WO | 95/35479 A1 | 12/1995 |

* cited by examiner

FIG_1

FIG_4

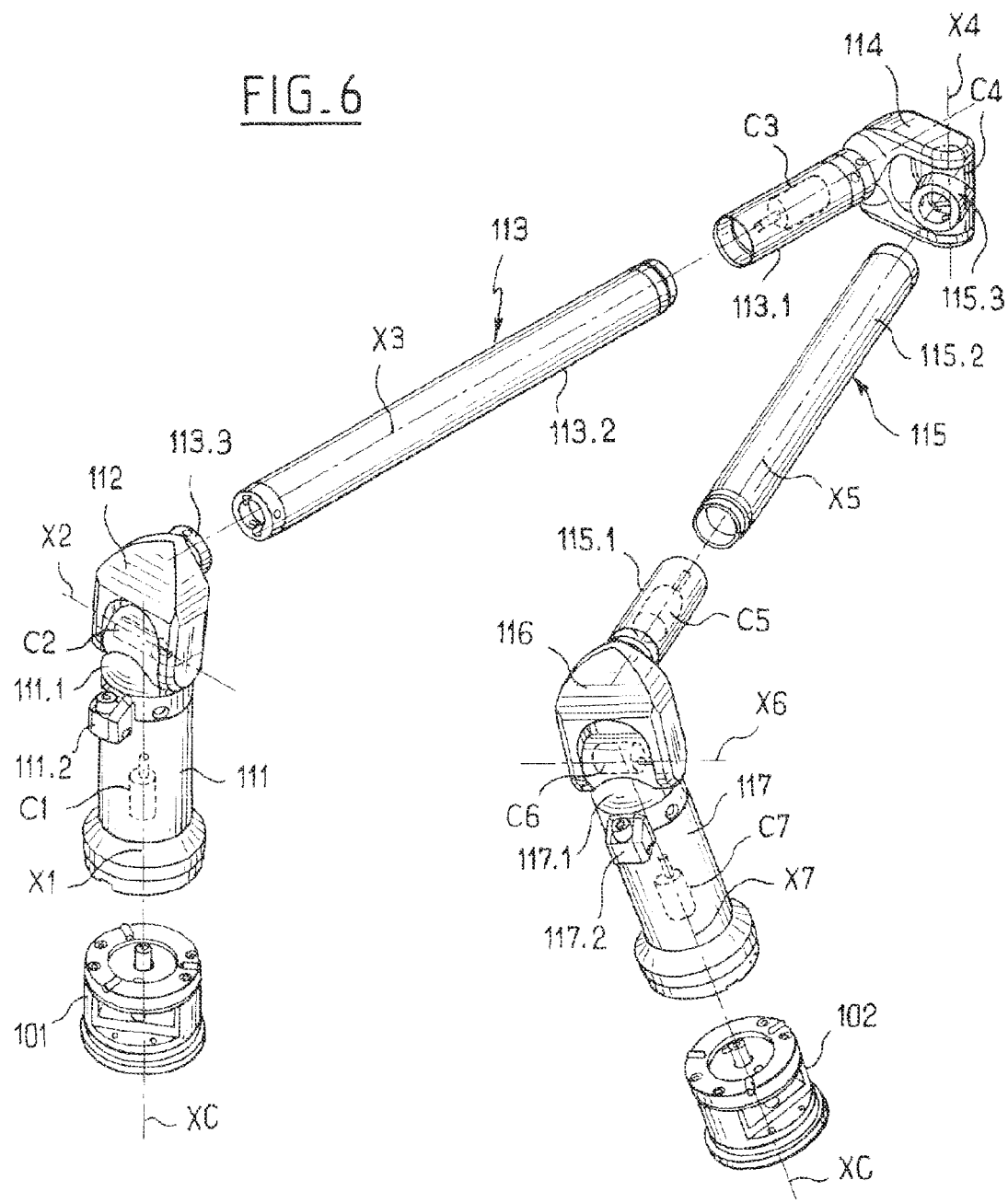

FIG_7
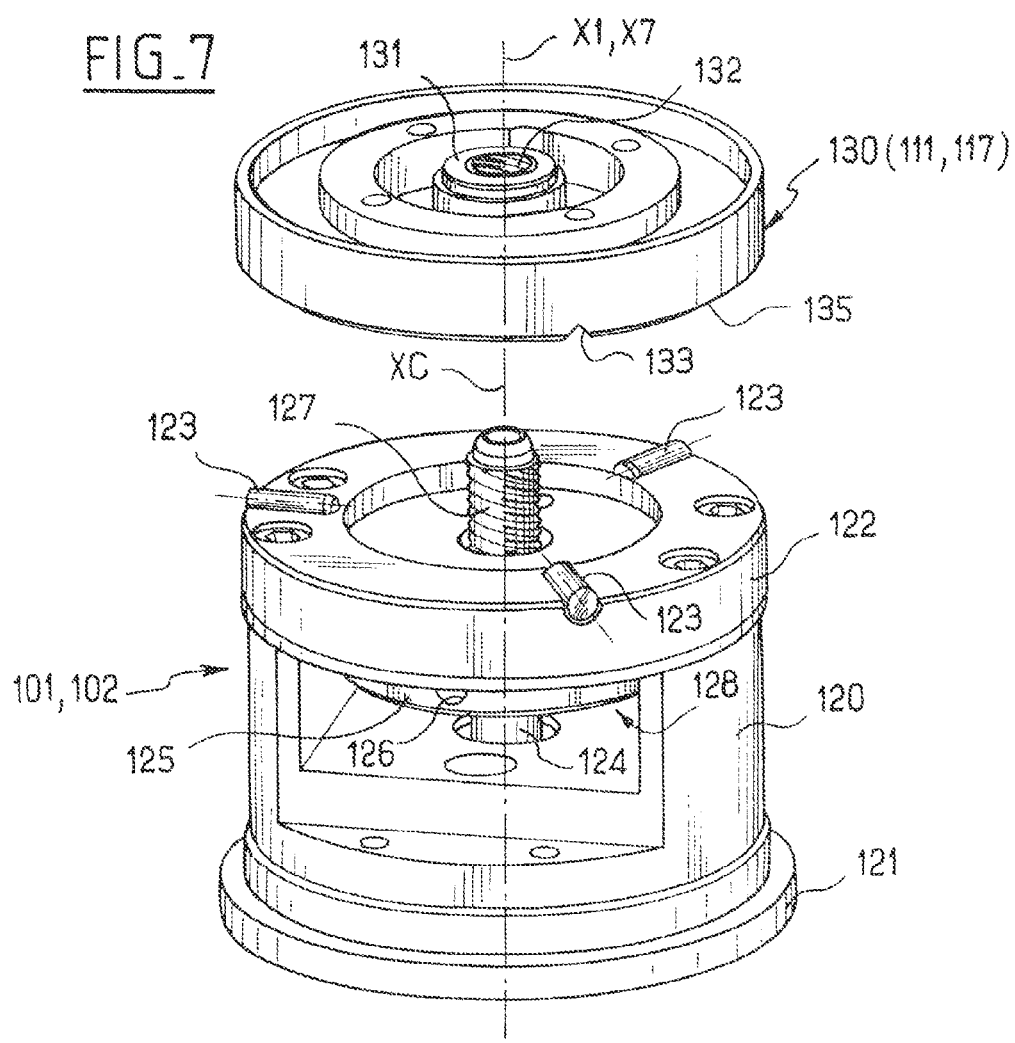
FIG_8
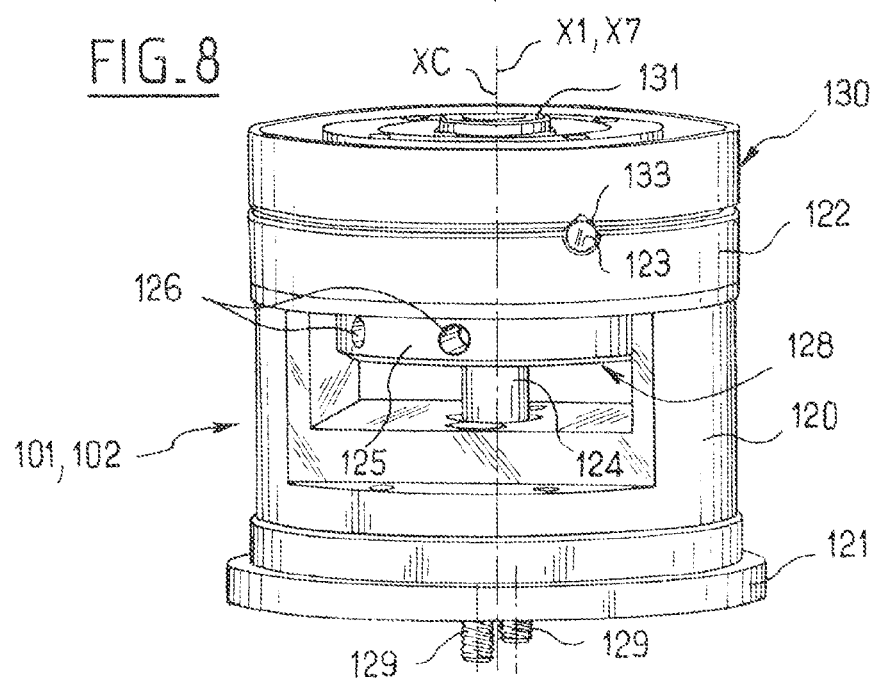

SYSTEM FOR IDENTIFYING THE POSITION OF THREE-DIMENSIONAL MACHINE FOR MEASURING OR MACHINING IN A FIXED FRAME OF REFERENCE

CROSS-REFERENCE TO RELATED APPLICATIONS

Applicant hereby claims foreign priority benefits under U.S.C. § 119 from French Patent Application No. 05 10745 filed on Oct. 21, 2005, the contents of which are incorporated by reference herein.

FIELD OF THE INVENTION

The present invention relates to a system for identifying the position of a three-dimensional machine for measuring or machining in a fixed frame of reference.

The three-dimensional machine in question may equally well be a measuring machine, in particular one making use of hinged arms, or a machine for machining, in particular a multi-axis milling machine.

BACKGROUND OF THE INVENTION

In the particular field of motor vehicles, there can be a need to identify various points on the bodywork of a motor vehicle that has suffered an accident or that is in the process of being assembled, in order to verify its shape by identifying predetermined points of said bodywork by means of a three-dimensional measuring device associated with a reference structure, commonly referred to as a "slab". Similarly, with a machining robot, it is advantageous to be able easily to identify the points of the motor vehicle bodywork that require special machining, such as milling or drilling.

In this content, reference can be made to patent documents FR-A-2 750 546 and FR-A-2 764 992 in the name of the Applicant.

Proposals have also been made for position-identifying systems using an emitter module carrying a source of light radiation mounted on a stand that can pivot about two distinct axes that are not mutually parallel, associated with two angular position sensors for sensing the rotary movement corresponding to the source relative to the stand, a plurality of targets being disposed around the emitter module in locations that are defined relative to a fixed frame of reference, as described in patent document WO-A-95/35479. Reference can also be made to patent document U.S. Pat. No. 6,611,346 (US 2001/0024283 A1) in the name of the Applicant, describing a position-identifying system using interactive bushings that are integrated in the support wall.

The above systems are entirely satisfactory in terms of accuracy, but they remain very constricting when the machining or measurement machine needs to be moved frequently relative to the article being measured, in particular motor vehicle bodywork.

On each occasion it is necessary to restart the position-identifying process in order to know where the machine is located in the frame of reference of the workpiece or where the workpiece is located in the frame of reference of the machine.

In order to complete the technological background, mention can be made of patent documents U.S. Pat. No. 4,961,267 and EP-A-0 398 073 which illustrate systems for identifying position in two dimensions, the first system also not being self-contained but being associated permanently with a supporting turntable, and the second system using a rod-and-cylinder type sliding assembly. Mention can also be made of patent document FR-A-2 776 373 in the name of the Applicant which discloses another system having a carriage that slides on a rail mounted to pivot about at least one axis.

BRIEF SUMMARY OF THE INVENTION

An object of the invention is to devise a position-identifying system that does not present the drawbacks of the above-mentioned systems, and that is arranged in particular to enable the machining or measurement machine to be moved frequently relative to the workpiece in question, without encountering the constraints mentioned above.

The above-specified technical problem is solved in accordance with the invention by means of a system for identifying the position of a three-dimensional measuring machine for measuring or machining in a fixed frame of reference, said machine resting on an essentially plane support wall associated with a machine stand, said system comprising:

a first base for resting at an identified point of the support wall associated with the machine stand, said base being fitted on its top with a bearing platform providing angular indexing about a central axis that is perpendicular to said support wall when said first base is in place;

a second base identical to the first base, for resting at an identified point on a support surface associated with the fixed frame of reference; and a multi-axis assembly having two hinged arms that are coupled together and having two endpieces that are coupled to said arms and that have bottom faces that are adapted to bear directly in an angularly-identified position on the bearing platform of a respective one of the first and second bases, each endpiece having a main axis that coincides with the central axis of the corresponding base when said endpiece is in place, said multi-axis assembly also being fitted with integrated angle encoders measuring the respective angles of rotation about each of its axes.

Thus, if the stand of the machine is moved, e.g. by running along the surface of a floor, the multiple-axis assembly with two hinged arms deforms naturally, following the displacement of said stand, and all of the displacements are automatically calculated by using the angle encoders integrated in the multi-axis assembly. This thus provides a follower system that achieves good flexibility.

Preferably, the first base is secured to the machine stand, and the second base is secured to a horizontal bar, itself secured to a floor surface. In particular, the horizontal bar is arranged to receive a plurality of second bases, and specifically a second base, in the vicinity of each of its ends. Thus, with a workpiece comprising motor vehicle bodywork, it is possible to secure such a bar under the bodywork so that the ends of said bar project beyond the width of said bodywork, thus enabling the multiple-axis assembly to be put into place very quickly on one side or the other of the bodywork.

In accordance with another advantageous embodiment, the multi-axis assembly has seven axes, and is fitted with seven associated integrated angle encoders.

Under such circumstances, it is then advantageous for the multi-axis assembly to include a hinged end fork connecting one arm to the first endpiece, a hinged end fork connecting the other arm to the second endpiece, and a central hinged fork interconnecting the two arms.

Provision can then be made for each arm to comprise a central segment constituted by a hollow tube interposed between two arm segments, one of which receives the angle encoder measuring the angle of rotation about the longitudinal axis of said arm. In which case, each central segment is advantageously selected from a set of hollow tubes of different lengths.

It is also advantageous to make provision for the connections between each central segment and the associated arm segments to be via quick-release couplings, and for the connection between each end fork and the associated endpiece to be a quick-release screw connection.

Finally, and preferably, each endpiece is fitted with a self-contained control and/or power supply unit.

Other characteristics and advantages of the invention appear more clearly in the light of the following description and the accompanying drawings, relating to a particular embodiment.

BRIEF DESCRIPTION OF THE DRAWINGS

Reference is made to the figures of the accompanying drawings, in which:

FIG. 6 is a view analogous to FIG. 4, but showing the main components in an exploded view, in particular for the purpose of showing the modular structure of the two arms of the multiple-axis assembly;

FIG. 7 is a perspective view showing a base of the position-identifying system of the invention that is surmounted by a bottom bearing plate forming part of an endpiece of the position-identifying system; and FIG. 8 is a view analogous to FIG. 7 showing the bearing plate in position on the associated base.

DETAILED DESCRIPTION OF THE INVENTION

Figure 1:
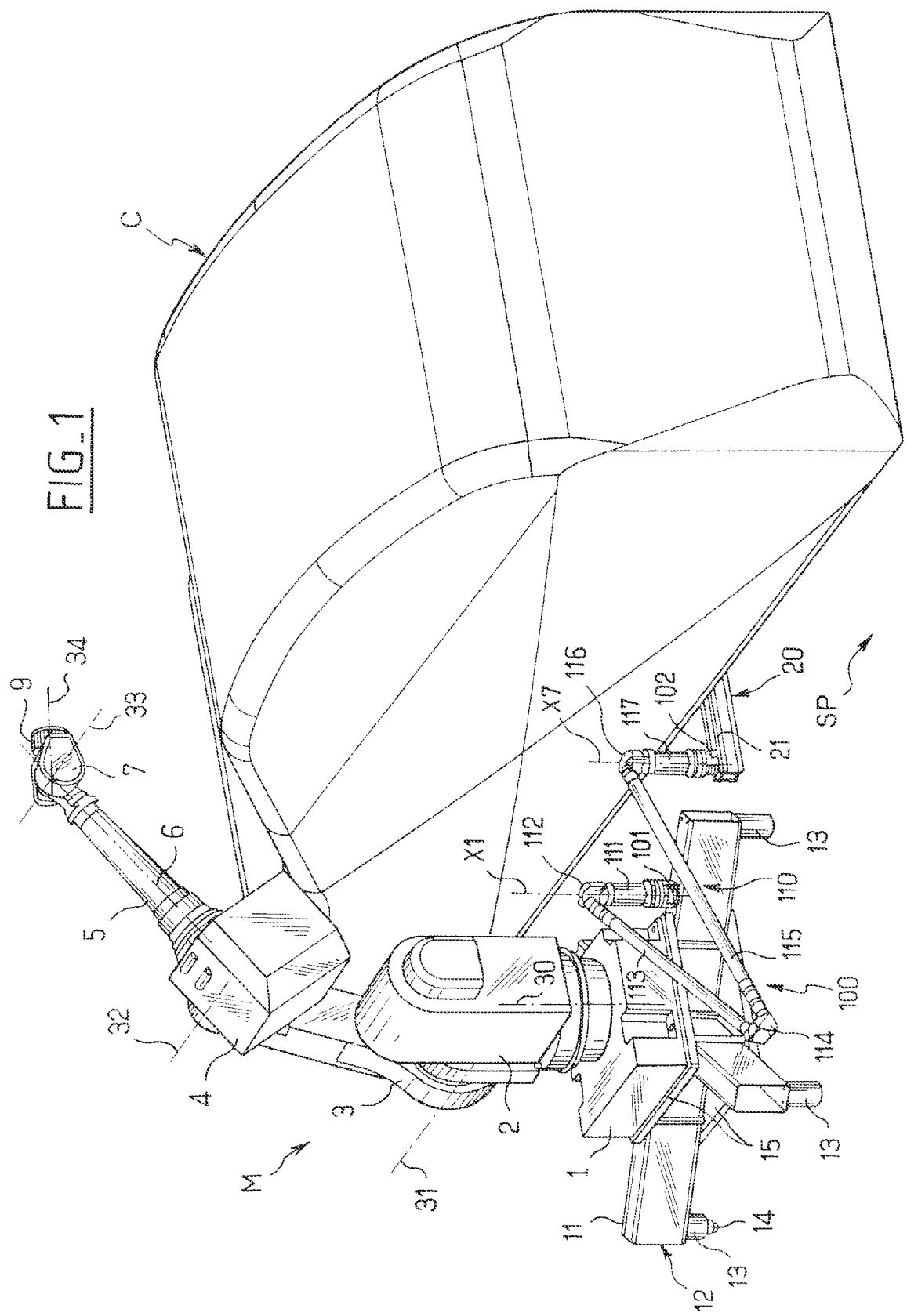
FIG. 1 is a perspective view showing a position-identifying system in accordance with the invention associated with a machine for three-dimensional machining that is to work on a piece of motor vehicle bodywork that is represented diagrammatically.

FIG. 1 shows a three-dimensional machine M having hinged arms, and specifically a milling robot for acting on a piece of motor vehicle bodywork C.

The milling machine M comprises a baseplate 1 surmounted by a turret 2 capable of turning about an axis 30 that is essentially vertical, and fitted with an arm 3 mounted to pivot about an axis 31 that is essentially horizontal. The arm 3 is in turn fitted with a functional assembly 4 mounted to pivot about an axis 32, and presenting an arm 5 with a longitudinal axis 6, said arm being terminated by a fork 7 mounted to turn about the axis 6, and also about a transverse axis 33. The end fork 7 is finally fitted with a machining tool 9, for example a rotary cutter, mounted to revolve about an axis 34.

The baseplate 1 of the machine M rests on an essentially plane support wall 11 which is associated with a machine stand 12, in this case implemented in the form of a cross-shaped assembly having end legs 13 terminated by roller elements 14, the cross-shaped stand 12 being clamped between top and bottom plates 15 used for securing the baseplate 1 of the machine M thereto in stable manner.

Underneath the vehicle bodywork C, there can be seen a horizontal bar 20 presenting a top support surface 21 that is associated with the fixed frame of reference, the horizontal bar 20 itself being secured to the surface of a floor SP.

There follows a description in greater detail of the position-identifying system in accordance with the invention, which is referenced 100, and which serves to identify the position of the machine M in a fixed frame of reference, even in the event of the stand 12 of said machine being displaced. As can be seen in FIG. 1, a first base 101 is provided for resting on an identified point of the support wall 11 associated with the machine stand 12, said base being provided on its top with a bearing platform that provides angular indexing about a central axis that is perpendicular to said support wall when said first base is in place thereon. Specifically, this first base 101 is secured, in particular by means of bolts, on one of the branches of the cross-shaped stand 12. The above-mentioned central axis then coincides with an axis X1 that is vertical in this example.

A second base 102 that is identical to the first base 101 is also provided, for the purpose of resting at an identified point on the support surface 21 associated with the fixed frame of reference. The central axis of this second base 102 then coincides with an axis X7, which is likewise vertical in this example.

As explained below with reference to FIG. 4, the position-identifying system can be used with bases 101 and 102 bearing against planes that are not mutually parallel, in which case the above-mentioned axes X1 and X7 are not parallel.

The position-identifying system 100 further includes, in addition to the bases 101 and 102, a multi-axis assembly 110 having two coupled-together hinged arms 113 and 115 and having two endpieces 111 and 117 coupled to said arms. Specifically, the multi-axis assembly 110 has seven axes and comprises a hinged end fork 112 connecting the arm 113 to the first endpiece 111, a hinged end fork 116 connecting the other arm 115 to the second endpiece 117, and a central hinged fork 114 interconnecting the two arms 113 and 115.

The bottom faces of the endpieces 111 and 117 are adapted to bear directly at an identified angle on the bearing platform of a respective one of the first and second bases 101 and 102, and each endpiece 111 and 117 has a main axis X1, X7 that coincides with the central axis of the corresponding base 101, 102 when said endpiece is in place thereon. Furthermore, as explained in greater detail below, the multi-axis assembly 110 is also fitted with integrated angle encoders measuring the respective angles of rotation about each of its axes, i.e. specifically seven integrated angle encoders each associated with a respective one of seven axes.

For a better understanding of the way each endpiece bears against a base 101 or 102, reference is made to FIGS. 7 and 8.

The base 101 or 102 comprises a cylindrical body 120 of central axis XC presenting a bearing soleplate 121 and bolting means 129 for bolting onto the associated bearing surface, specifically the above-mentioned top face 21 of the horizontal bar 20 or the bearing surface 11 associated with the stand 12 for the machine M. The cylindrical body 120 is surmounted by a bearing platform 122 with a top face that is fitted with three fingers 123 disposed at 120° intervals, each having a surface that projects from the plane of the top face of said bearing platform. The base 101 or 102 also includes a central shaft 124 mounted to turn about the central axis XC, and presenting an externally threaded end 127 that projects upwards. The shaft 124 can be turned about its axis XC by a drive member 125 that is accessible through a window 128, and it can be moved via radial holes 126 enabling an appropriate tool to be inserted therein.

FIGS. 7 and 8 also show a plate 130 which is in fact the bottom component of the corresponding endpiece 111 or 117. The plate 130 has a central hub 131 with an internal thread 132 adapted to screw onto the thread 127 of the shaft 124. The bottom face 135 of the plate 130 presents three V-shaped notches 133 for co-operating with the three above-mentioned fingers 123. In the bearing position, as shown in FIG. 8, the plate 130 rests via its V-shaped notches 133 on the three fingers 123 without there being any contact between the facing annular faces. Retention is provided by screwing the thread portion 127 until clamping is achieved that guarantees accurate relative positioning, and that ensures that position is accurately identified relative to the bearing surface. Thus, once the two endpieces 111, 117 have been fastened in identified positions on the faces 101, 102, a hinged system is provided that will deform whenever the stand 12 of the machine M is displaced. The angle encoders integrated in the multi-axis assembly 110 operate automatically to measure the respective angles of rotation about each of the corresponding axes, so there is no need to reinitialize the position-identifying process each time the stand of the machine is displaced.

Figure 2:
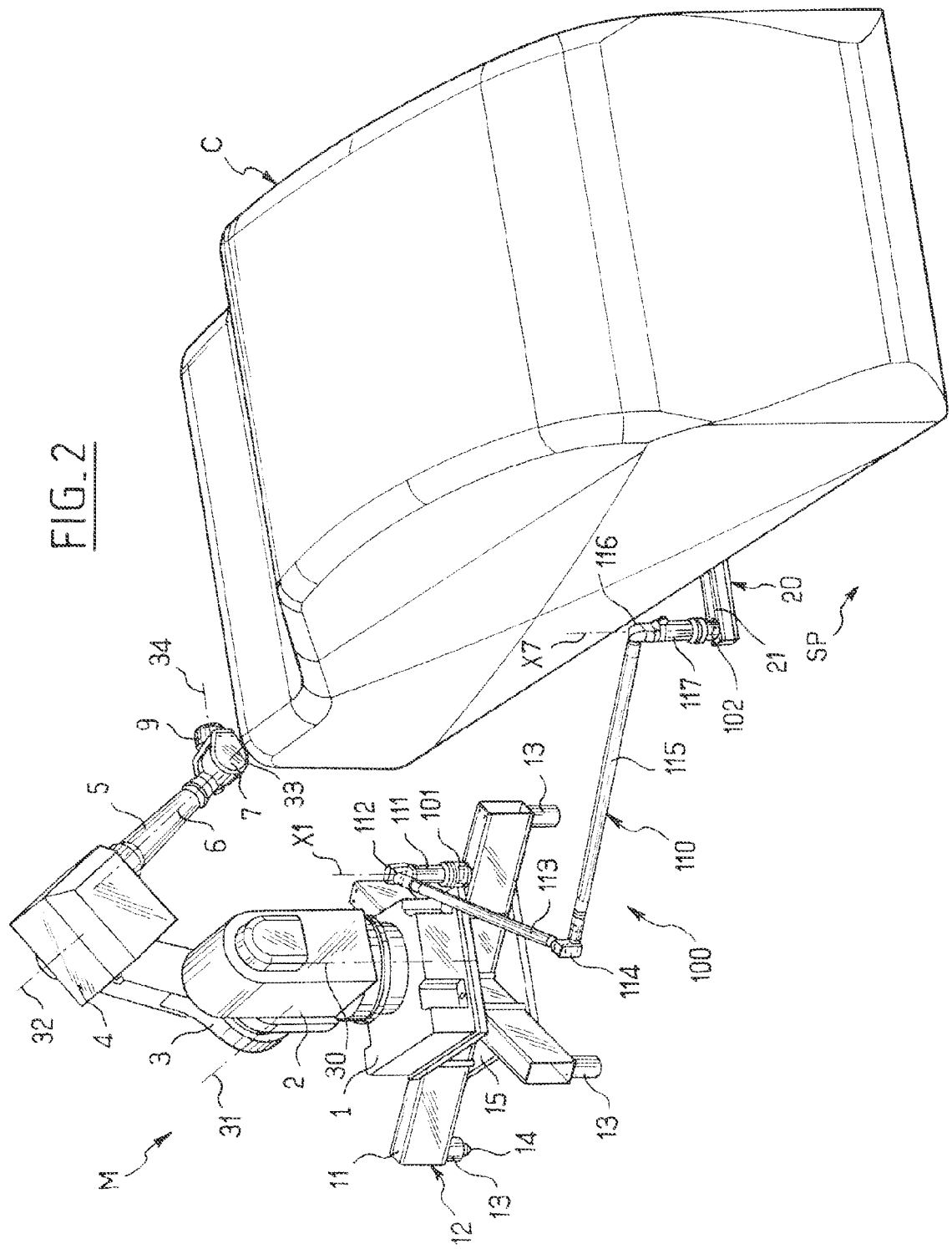
FIG. 2 shows the same system after the stand of the machine has been moved relative to the motor vehicle bodywork, the multiple-axis assembly with two coupled-together hinged arms then being deformed as it follows the displacement of said stand.

FIG. 2 thus shows a new configuration in which the multi-axis assembly 110 has its coupled-together arms 113 and 115 now forming an obtuse angle.

Figure 3:
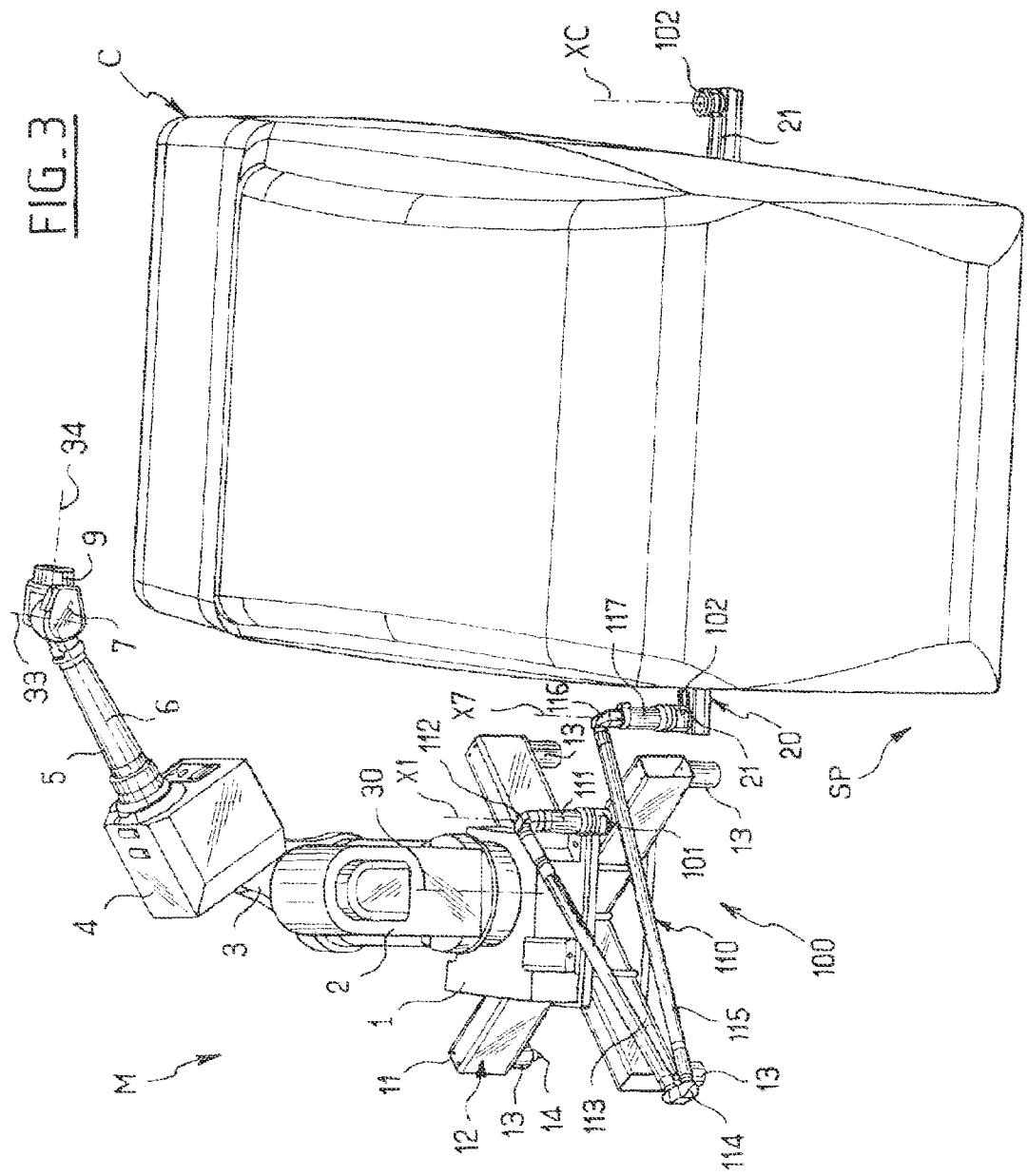
FIG. 3 is an analogous view showing a horizontal bar supporting two bases, in order to enable the position-identifying system and the working equipment of a machining machine to be placed on one side or the other of the motor vehicle bodywork.

For greater convenience, and as shown in FIG. 3, provision is made for the horizontal bar 20 to support a second base 102 in the vicinity of its other end. Thus, when it is desired for the milling machine to act on the other side, it suffices to decouple the endpiece 117 from the base 102, then to displace the assembly associated with the stand of the machine, and finally to reengage said endpiece 117 on the other base 102 which is already in position at the other end of the horizontal bar 20.

Figure 4:
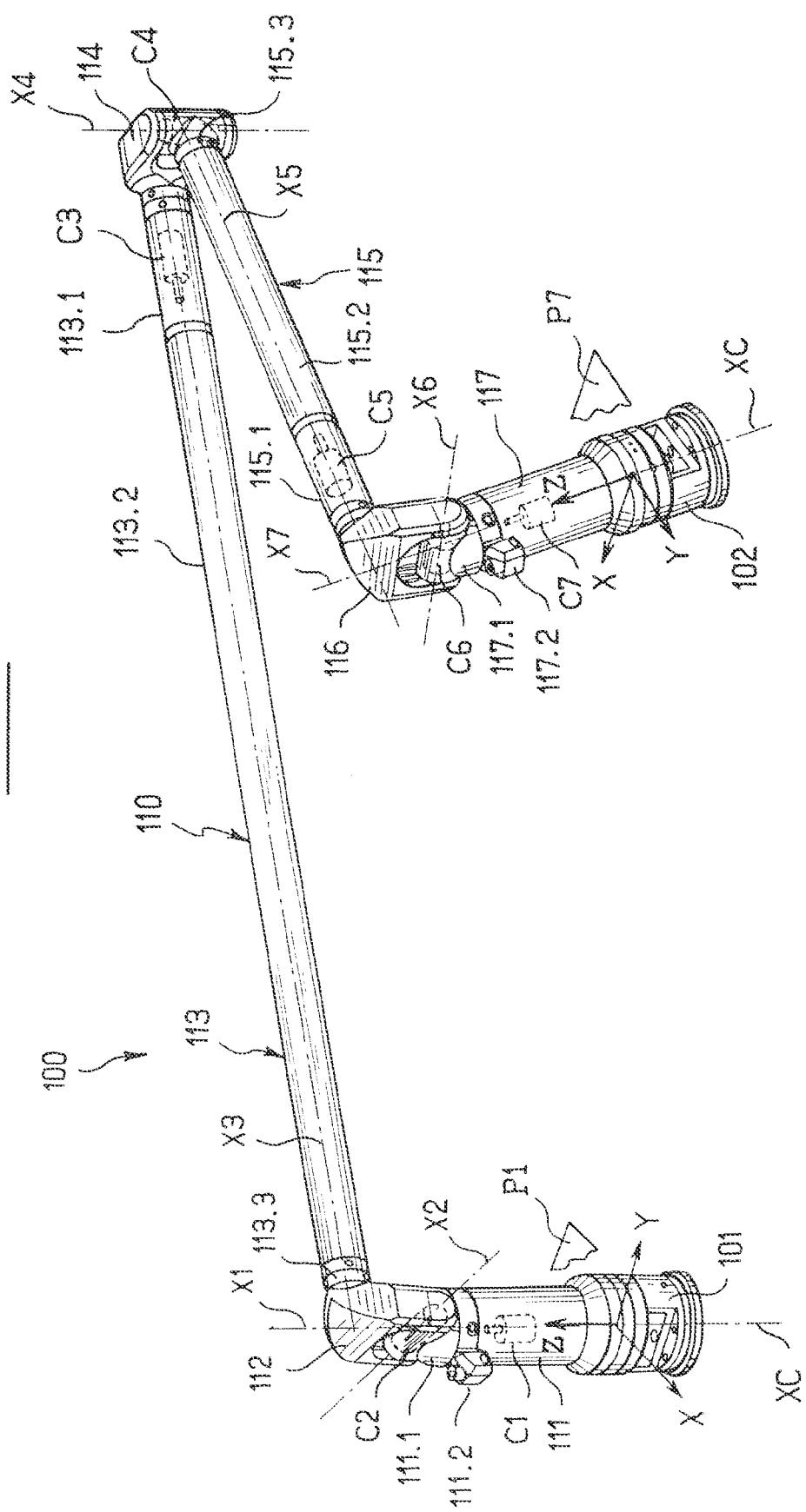
FIG. 4 is a perspective view showing the position-identifying system in isolation, with its arms forming an acute angle.
Figure 5:
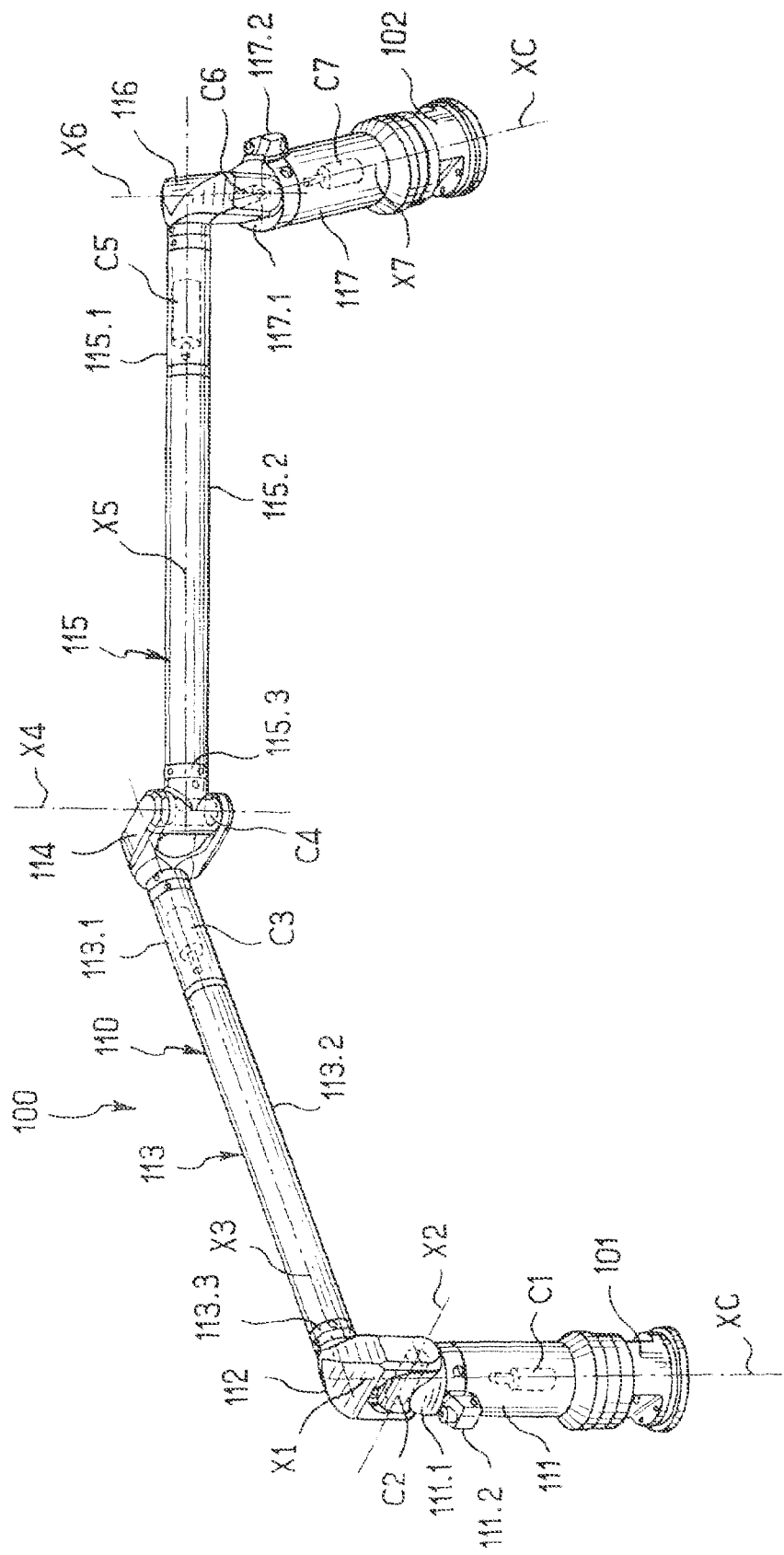
FIG. 5 is a view analogous to the preceding figure, showing another configuration for the two-arm multiple-axis assembly, the arms forming an obtuse angle.

FIGS. 4 and 5 show more clearly the components of the position-adjusting system 100, which are mostly already described above.

Thus, starting from the first base 101, there can be seen the endpiece 111 whose bottom face bears directly in an angularly-identified position on the bearing platform of the base 101, the bearing plane being represented at P1. The endpiece 111 includes an integrated encoder C1 for measuring rotation of its end 111.1 about the axis X1 of said endpiece. The hinged end fork 112 can pivot about an axis X2, with the angle of rotation being measured by an integrated encoder C2. Then there is the arm 113 whose other end is connected to a fork 114 capable of turning about the axis X3 of said arm, with the angle of rotation being measured by an integrated sensor C3. The other arm 115 is hinged to the fork 114 capable of turning about an axis X4, with the angle of rotation being measured by an integrated encoder C4 associated with the hinged central fork 114. The other end of the arm 115 is connected to the hinged end fork 116 which is capable of turning about the axis X5 of the arm, with its angle of rotation being measured by the integrated encoder C5. The end fork 116 can turn about an axis X6 on the top portion 117.1 of the endpiece 117, with the angle of rotation being measured by an integrated encoder C6. Finally, the top portion 117.1 of the endpiece 117 can turn relative to said endpiece about an axis X7, with the angle of rotation being measured by an integrated encoder 7. The bottom face of the endpiece 117 bears directly in an angularly-identified position against the bearing platform of the second base 102, with the bearing plane being represented by a plane P7 which, in FIGS. 4 and 5 is not parallel to the plane P1.

The above-described assembly can enable position to be identified in an X, Y, Z frame of reference associated with the machine, i.e. with the first base 101, relative to a stationary X, Y, Z frame of reference, specifically the frame of reference associated with the second base 102.

In FIGS. 4 and 5, there can be also be seen units 111.2 and 117.2 that correspond to controlling and/or independently powering the endpieces 111 and 117, respectively. Preferably, wireless transmission means (e.g. WIFI) are used in order to avoid the constricting presence of connecting cables.

The exploded view of FIG. 6 shows the separate components more clearly, and in particular makes it easier to understand the modular arrangement in this embodiment of the two arms 113 and 115.

Each arm 113, 115 comprises a central segment constituted by a hollow tube 113.2, 115.2 interposed between two arm segments 113.1 & 113.3, and 115.1 & 115.3, with one of the segments (113.1, 115.1) receiving the integrated angle encoder C3, C5 that measures the angle of rotation about the longitudinal axis X3, X5 of said arm.

In order to take maximum advantage of such modularity, provision can be made for each central segment 113.2, 115.2 to be selected from a set of hollow tubes having different lengths. This makes it possible to adapt very flexibly to any particular circumstances.

It is also advantageous to make provision for the connections between each central segment 113.2, 115.2 and the associated arm segments 113.1 & 113.3, 115.1 & 115.3 to be via quick-release couplings. This then makes it possible for the multi-axis assembly to be stored easily in a case, or to replace one hollow tube by another tube of a different length, both quickly and without it being necessary to reinitialize the system.

As explained above, the connection between each end fork 112, 116 and the associated endpiece 111, 117 is a quick-release screw connection.

A position-identifying system has thus been provided that provides a very high degree of flexibility and that avoids restarting measurements on each occasion that the machine stand is displaced. It is now possible to displace the machine stand freely without any need to be concerned with correctly positioning the measurement sensor (or the machining tool associated with said machine) relative to the workpiece, and in particular the motor vehicle bodywork.

It will be understood that the two bases could bear against planes that are not parallel or that are at different levels, the multi-axis assembly deforming easily in three dimensions in order to follow the displacement of the machine stand.

The invention is not limited to the embodiment described above, but on the contrary covers any variant using equivalent means to reproduce the essential characteristics specified above.

In particular, although not shown herein, additional support means could be provided seeking to make it easier to keep the arms in a position that is substantially horizontal, without sagging in the vicinity of the central fork under the effect of its weight, with this generally being advantageous when the arms are long. By way of example, these means could comprise an omnidirectional roller arranged under the central fork and/or for at least one of the two arms, a lateral support system having a bar parallel to the arm and an assisting actuator or spring, as shown in the Applicants' patent document U.S. Pat. No. 5,189,797.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A system for identifying the position of a three-dimensional machine in a fixed frame of reference, said machine resting on an essentially plane support wall associated with a machine stand, the system comprising:
   a first base for resting at an identified point of the support wall associated with the machine stand, said base being fitted on its top with a bearing platform providing angular indexing about a central axis that is perpendicular to said support wall when said first base is in place;
   a second base identical to the first base, for resting at an identified point on a support surface associated with the fixed frame of reference; and
   a multi-axis assembly having two hinged arms that are coupled together and having two endpieces that are coupled to said arms and that have bottom faces that are adapted to bear directly in an angularly-identified position on the bearing platform of a respective one of the first and second bases, each endpiece having a main axis that coincides with the central axis of the corresponding base when said endpiece is in place, said multi-axis assembly also being fitted with integrated angle encoders measuring the respective angles of rotation about each of its axes.

2. A system according to claim 1, wherein the first base is secured to the machine stand, and the second base is secured to a horizontal bar itself secured to a floor surface.

3. A system according to claim 2, wherein the horizontal bar is arranged to receive a plurality of second bases.

4. A system according to claim 3, wherein the horizontal bar supports a second base in the vicinity of each of its ends.

5. A system according to claim 1, wherein the multi-axis assembly has seven axes, and is fitted with seven associated integrated angle encoders.

6. A system according to claim 5, wherein the multi-axis assembly includes a hinged end fork connecting one arm to the first endpiece, a hinged end fork connecting the other arm to the second endpiece, and a central hinged fork interconnecting the two arms.

7. A system according to claim 6, wherein each arm comprises a central segment constituted by a hollow tube interposed between two arm segments, one of which receives the angle encoder measuring the angle of rotation about the longitudinal axis of said arm.

8. A system according to claim 7, wherein each central segment is selected from a set of hollow tubes of different lengths.

9. A system according to claim 7, wherein the connections between each central segment and the associated arm segments are via quick-release couplings.

10. A system according to claim 6, wherein the connection between each end fork and the associated endpiece is a quick-release screw connection.

11. A system according to claim 1, wherein each endpiece is fitted with a self-contained control and/or power supply unit.

12. A system for identifying in a fixed frame of reference the three-dimensional position and orientation of a three-dimensional machine, said machine resting on an essentially plane support wall associated with a machine stand, the system comprising:
   a first base for resting at an identified point of the support wall associated with the machine stand, said base being fitted on its top with a bearing platform providing angular indexing about a central axis that is perpendicular to said support wall when said first base is in place;
   a second base identical to the first base, for resting at an identified point on a support surface associated with the fixed frame of reference; and
   a multi-axis assembly having two hinged arms that are coupled together and having two endpieces that are coupled to said arms and that have bottom faces that are adapted to bear directly in an angularly-identified position on the bearing platform of a respective one of the first and second bases, each endpiece having a main axis that coincides with the central axis of the corresponding base when said endpiece is in place, said multi-axis assembly also being fitted with integrated angle encoders measuring the respective angles of rotation about each of its axes.

* * * * *